(12) United States Patent
Konno et al.

(10) Patent No.: US 6,849,013 B2
(45) Date of Patent: Feb. 1, 2005

(54) SLIDING CONTACT GUIDE FOR TRANSMISSION DEVICE

(75) Inventors: Masahiko Konno, Osaka (JP); Hiroshi Hashimoto, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/281,496

(22) Filed: Oct. 28, 2002

(65) Prior Publication Data

US 2003/0092520 A1 May 15, 2003

(30) Foreign Application Priority Data

Nov. 14, 2001 (JP) .......................................... 2001-349134

(51) Int. Cl.$^7$ ................................................. F16H 7/08
(52) U.S. Cl. ..................................... 474/111; 474/140
(58) Field of Search ................................ 474/111, 140, 474/110, 109

(56) References Cited

U.S. PATENT DOCUMENTS 5,318,482 A * 6/1994 Sato et al. .................. 474/111
5,425,680 A * 6/1995 Young ........................ 474/111
6,601,473 B2 * 8/2003 Suzuki ....................... 474/140
6,669,590 B2 * 12/2003 Kawano et al. ............. 474/140
2002/0132688 A1    9/2002 Ono

FOREIGN PATENT DOCUMENTS

| EP | 1 286 083 A2 | 2/2003 | |
| GB | 2 371 613 A | 7/2002 | |
| JP | 08-226506 A * | 9/1996 | ............ F16H/7/18 |
| JP | 10-311395 A * | 11/1998 | ............ F16H/7/18 |
| JP | 3253951 B1 | 11/2001 | |

* cited by examiner

Primary Examiner—Marcus Charles
(74) Attorney, Agent, or Firm—Howson and Howson

(57) ABSTRACT

In a sliding contact guide for a drive chain or other flexible transmission device, a guide body includes a shoe 102 and a slotted, plate-receiving portion 102 integrally molded on the back of the shoe. A reinforcing plate is inserted into the slot. The guide body has a mounting hole near one end for receiving a mounting shaft. The reinforcing plate, on the other hand, has an arcuate bearing portion which extends only part way around the mounting shaft.

2 Claims, 7 Drawing Sheets

SLIDING CONTACT GUIDE FOR TRANSMISSION DEVICE

CROSS REFERENCE TO RELATED APPLICATION

This application claims priority under 35 U.S.C. §119 on Japanese patent application 349134/2001, filed Nov. 14, 2001.

FIELD OF THE INVENTION

This invention relates to a sliding contact guide for use a transmission device which transmits power by means of an endless, flexible transmission medium such as a chain cooperating with a driving sprocket and one or more driven sprockets, or a belt cooperating with a driving pulley and one or more driven pulleys.

BACKGROUND OF THE INVENTION

Engines, as well as other machines, may include a transmission device, in which power is transmitted through a flexible transmission medium such a chain, a belt or the like, as shown in FIG. 12. A sliding contact guide, which can be either a movable guide Ga or a fixed guide Gb, may be provided in sliding contact with the transmission medium, such as chain CH, for guiding the transmission medium and limiting its path of travel. The movable guide and the fixed guide prevent vibration of the power transmitting medium CH, both in, and transverse to, its plane of travel. The movable guide also cooperates with a tensioner T to impart appropriate tension to the transmission medium. These sliding contact guides are attached to a frame of the engine E or other machine by means of shafts P, which may be mounting bolts, mounting pins, or the like.

FIG. 9 shows, in elevational view, a plastic movable guide 300, also referred to as a tensioner lever, which is used in a chain transmission. This guide is described in Japanese Patent Application No. 2000-382798.

FIG. 10 is a bottom plan view of the plastic movable guide of FIG. 9.

In this plastic movable guide 300, a guide body 301 includes a shoe 302 having a surface which is in sliding contact with a power transmission medium such as a traveling chain CH or a belt. The guide also comprises a plate-receiving portion 303 extending along the longitudinal direction of the guide on the back of the shoe 302. The shoe and plate-receiving portion are integrally molded as a unit from a synthetic resin. A reinforcing plate 308, composed of a rigid material, reinforces the guide body 301, fits into a slot 307 in the plate-receiving portion 303. The slot extends along the longitudinal direction of the guide and its opening faces in a direction opposite to the direction in which the chain-engaging surface of the shoe faces. A mounting hole 305 is provided adjacent one end of the plate-receiving portion 303 for mounting the guide body on a mounting shaft. A hole 308A is also provided in the reinforcing plate 308. The hole 308A is brought into register with the mounting hole 305 in the guide body 301 when the reinforcing plate is fitted into the slot in the plate-receiving portion of the guide body, so that the guide body and reinforcing plate may be fastened together on the mounting shaft.

In the plastic movable guide 300, the guide body 301, which includes the shoe 302 and the plate-receiving portion 303 on the back of the shoe, is molded from a synthetic resin. The guide body 301 engages the transmission medium in sliding contact therewith, therefore it is not necessary to provide a separate shoe member. Consequently the number of parts, and the number of production steps needed to produce the guide, are reduced. Furthermore, since the slot 307 extends in the longitudinal direction of the guide, its opening is situated in an edge of the plate-receiving portion 303 in the guide body 301, and a reinforcing plate 308 is fitted into the slot, the strength of the guide in the pivoting direction is increased, and its bending rigidity and toughness are significantly improved.

The above-described plastic movable guide is mounted on a shaft such as a mounting bolt or the like, the shaft being received in the mounting hole in the guide body and the hole in the reinforcing plate. These holes must be correctly positioned in register with each other, and positioning of the holes in the process of assembling the guide required considerable time. Furthermore, when reinforcing plates used in the conventional guide are punched out of a rolled material M or the like, as shown in FIG. 11, the areas of the unused portions NG of the rolled material M are large. The resulting low yield contributes to a high production cost. These problems exist not only in the production of movable guides, but also in the production of fixed sliding contact guides in which a reinforcing plate is fitted into a slot in the guide body.

Another problem with conventional guides is the demand for reduced weight in the guides resulting from the high cost of fuel.

The inventors have aggressively examined and analyzed the load distribution in the above-described sliding contact guides, and have found surprisingly that the load F is concentrated on an upper side surface of the hole in the reinforcing plate, as shown in FIG. 9, and the lower side surface of the inserting hole receives no load at all.

Accordingly, the objects of the invention are to solve the above-mentioned prior art problems, and to provide a sliding contact guide having high assembly efficiency, improved yield of material, and reduced overall weight, both in a pivoting guide and in a fixed guide.

SUMMARY OF THE INVENTION

The sliding contact guide in accordance with the invention comprises an elongated guide body and a reinforcing plate for reinforcing the guide body. The guide body includes a shoe having opposite front and back sides, a transmission engaging surface on the front side, and facing in a first direction, for sliding contact with a traveling flexible power transmission medium, and a plate-receiving portion extending longitudinally along the back side. The shoe and plate-receiving portion of the guide body are integrally molded as a unit from a synthetic resin. The plate-receiving portion has a longitudinally extending slot having an opening facing in a direction opposite to said first direction. The reinforcing plate is fitted in the slot in the plate-receiving portion of the guide body, and extends along the longitudinal direction of the guide. The guide body has a mounting hole adjacent one end thereof for receiving a mounting shaft, the mounting hole having an inner periphery in the form of cylindrical surface for completely surrounding the mounting shaft. To address the above objects, an arcuate bearing portion is formed on the reinforcing plate adjacent one end thereof, the arcuate bearing portion being in register with a part of the inner periphery of the mounting hole for engagement with the mounting shaft. The arcuate bearing surface has ends spaced from each other to provide an opening, whereby, when the guide is mounted on the mounting shaft, the arcuate bearing portion extends around only a part of the circumference of the mounting shaft.

The material of which the guide body is formed is not especially limited. However, since the front surface of the guide body functions as a shoe for sliding contact with a chain, a belt or the like, the material is preferably a so-called engineering plastic such as a polyamide type resin having good wear resistance and lubricating properties. The material may be a fiber-reinforced plastic, or a fiber-reinforced plastic used concurrently with another plastic. The material of the reinforcing plate is also not especially limited, provided that the reinforcing plate has sufficient bending rigidity and strength for use in a sliding contact guide for a transmission device. Iron-based metals such as cast iron, stainless steel and the like, nonferrous metals such as aluminum, magnesium, titanium and the like, engineering plastics such as polyamide type resin and the like, and fiber reinforced plastics are preferably used as materials for the reinforcing plate.

Because the arcuate bearing-portion of the reinforcing plate is partly open, even if the guide body and the reinforcing plate are not precisely positioned relative to each other during assembly the mounting shaft can be easily inserted into the mounting hole of the guide. Moreover, even if the reinforcing plate, when inserted into the slot, is slightly shifted relative to the mounting hole of the guide body, the reinforcing plate is moved so that the shaft is received in the deepest part of the bearing portion due to its arcuate shape. Consequently the reinforcing plate and the guide body are appropriately positioned relative to each other.

Significantly, since the reinforcing plate has a partly open, arcuate bearing portion instead of a bearing hole, for positioning the guide body and fastening the reinforcing plate and guide body together, the amount of material required for the reinforcing plate can be reduced, with a resulting reduction in the overall weight of the guide. Moreover, a larger number of reinforcing plates can be punched out of a given area of sheet material.

DETAILED DESCRIPTION OF THE PREFERRED EMBODIMENTS

Figure 1:
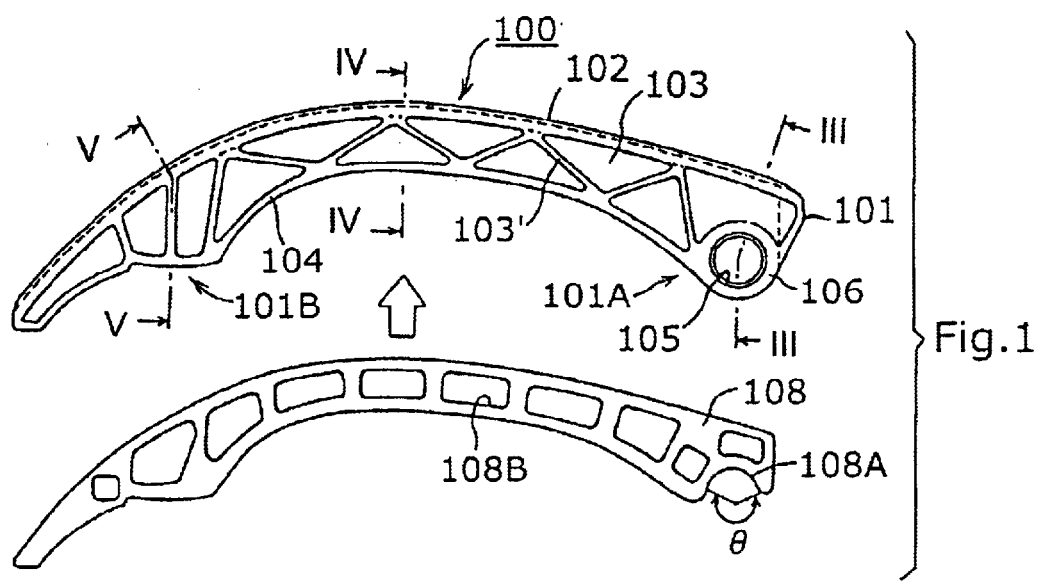
FIG. 1 is an exploded side elevational view of a movable guide in accordance with a first embodiment of the invention.
Figure 2:
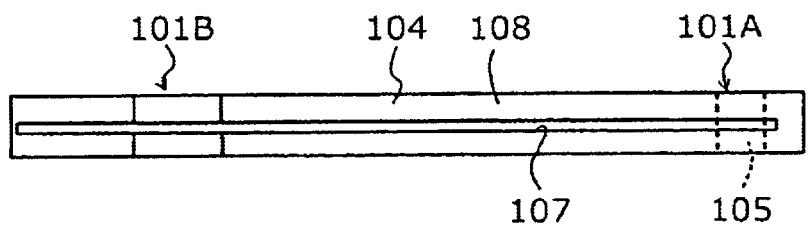
FIG. 2 is a bottom plan view of the guide shown in FIG. 1.
Figure 3:
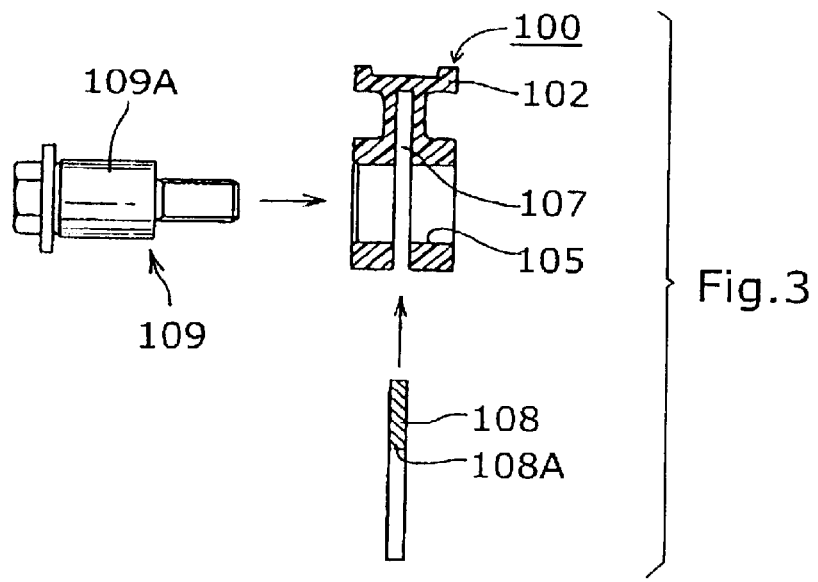
FIG. 3 is an exploded cross-sectional view taken on surface III—III in FIG. 1.
Figure 4:
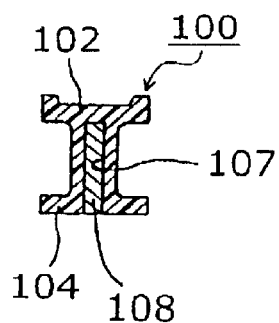
FIG. 4 is a cross-sectional view taken on plane IV—IV in FIG. 1.

In the embodiment of the invention depicted in FIGS. 1–5, a guide body 100, which is a plastic body integrally molded from synthetic resin, comprises a shoe 102 having a sliding surface, facing upward in FIG. 1, on which a traveling chain slides, and a longitudinally extending, plate-receiving portion 103 on the back side of the shoe 102, extending in the direction opposite to the direction in which the sliding surface of the shoe faces. The guide body 100 includes a flange 104, formed on the edge of this plate-receiving portion 103 remote from the shoe, and a boss 106 having a mounting hole 105 for pivotally mounting the guide body on a shaft extending from the frame of an engine, or other machine having a flexible drive. The plate-receiving portion 103 has a truss-shaped array of reinforcing ribs 103', and, as shown in FIGS. 2–4, a slot 107 having its opening centrally located in flange 104, extending along the longitudinal direction of the guide, and facing in the direction opposite to the direction in which the sliding surface of the shoe faces.

Figure 5:
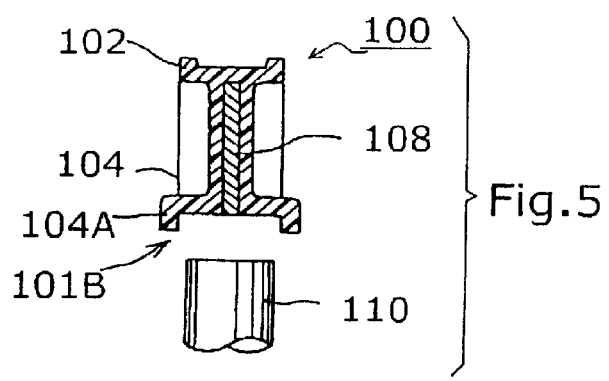
FIG. 5 is a cross-sectional view taken on plane V—V in FIG. 1, showing a plunger being brought into contact with a plunger-receiving portion adjacent the front end of the guide.

The slot 107, in the plate-receiving portion 103, is perpendicular to the chain-engaging surface of shoe 102, as can be seen from FIGS. 3–5. To reinforce the guide body 101, a reinforcing plate 108 having an arcuate bearing portion 108A is fitted into the slot 107.

As shown in FIGS. 1 and 2, a plunger-receiving portion 101B is provided adjacent the end of the guide body 101 remote from the mounting hole 105, for engagement with the plunger 110 of a tensioner (not shown). The shape of the plunger-receiving portion 101B is not especially limited. To prevent the plunger from becoming dislodged from the plunger-receiving portion 101B as a result of transverse vibration of the guide, protrusions 104A, for preventing transverse shift of the guide relative to the plunger are preferably formed at the edges of the flange 104, as shown in FIG. 4.

The plastic movable guide, with the reinforcing plate 108 fitted into its slot, is attached to, and pivoted on, the frame of an engine, or other machine having a flexible transmission, by means of a bolt, pin or the like fixed to the frame. As shown in FIG. 3, the mounting shaft may take the form of a shoulder bolt 109, having a pivot portion 109A. When the guide body 101 and the reinforcing plate 108 are assembled, insertion of the bolt through the mounting hole 105 fastens the guide body and reinforcing plate together at the pivot end of the assembly.

The arcuate bearing portion 108A of the reinforcing plate 108 is held between the pivot portion 109A of the shoulder bolt and the inner end of the slot, which is the back side of shoe 102. Even though the arcuate bearing portion 108A of the reinforcing plate only partially surrounds the pivot portion of the mounting bolt, the reinforcing plate 108 will not become dislodged from the guide body 101. Furthermore, even if there is a difference between the coefficients of thermal expansion of the guide body and the reinforcing plate 108, the guide body 101 and the reinforcing plate 108 are free to move longitudinally relative to each other except at the location of the mounting bolt. Therefore, deformation and breakage of the reinforcing plate 108 and guide body are avoided.

The ratio of the arc length of the opening of the arcuate bearing portion 108A to the circumference of a full circle in which the arc of the bearing portion lies, can vary. However, for reliable prevention of dislodgement of the reinforcing plate from the guide body as a result of vibration, shock, or the like, the arc length of the open part of the arcuate bearing portion 108A is preferably ⅔ or less of the circumference of the full circle. For example, when the arc length of the open portion is ⅔ of the circumference of the full circle, as shown in FIG. 1, the angle 2 is 240 degrees. Although in the embodiment shown in FIGS. 1–5, the radius of the arc of the bearing portion and the radius of the mounting hole of the guide body are equal, the radius of the arc of the bearing portion may be slightly larger than the radius of the mounting hole of the guide body.

As shown in FIG. 1, holes 108B may be punched in the reinforcing plate to reduce its weight and thereby further reduce the overall weight of the guide assembly.

Figure 6:
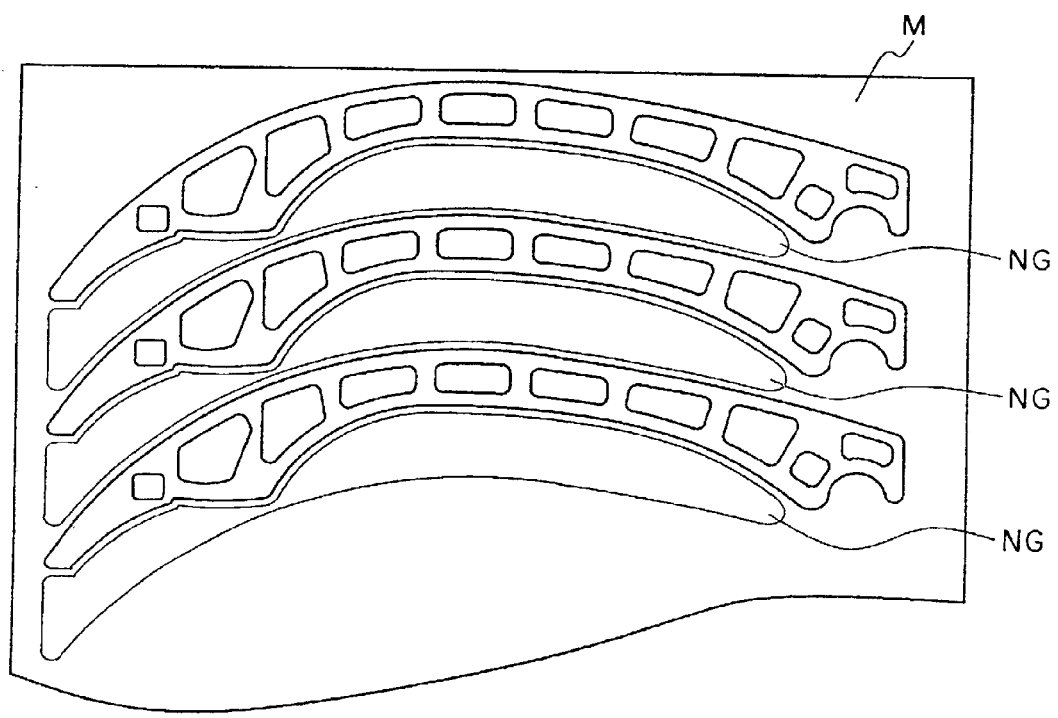
FIG. 6 is schematic view illustrating the yield in a punching process used to produce the reinforcing plate of the first embodiment of the invention.
Figure 11:
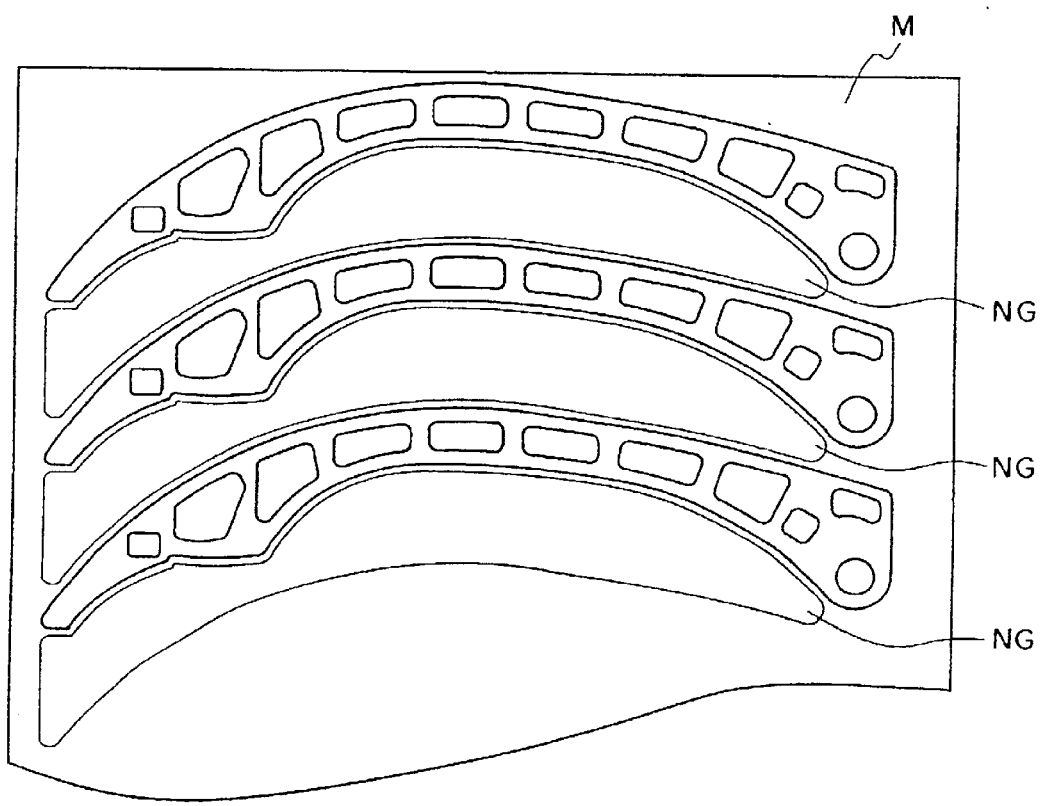
FIG. 11 is a schematic view illustrating the yield in a punching process used to produce the conventional reinforcing plate.
Figure 12:
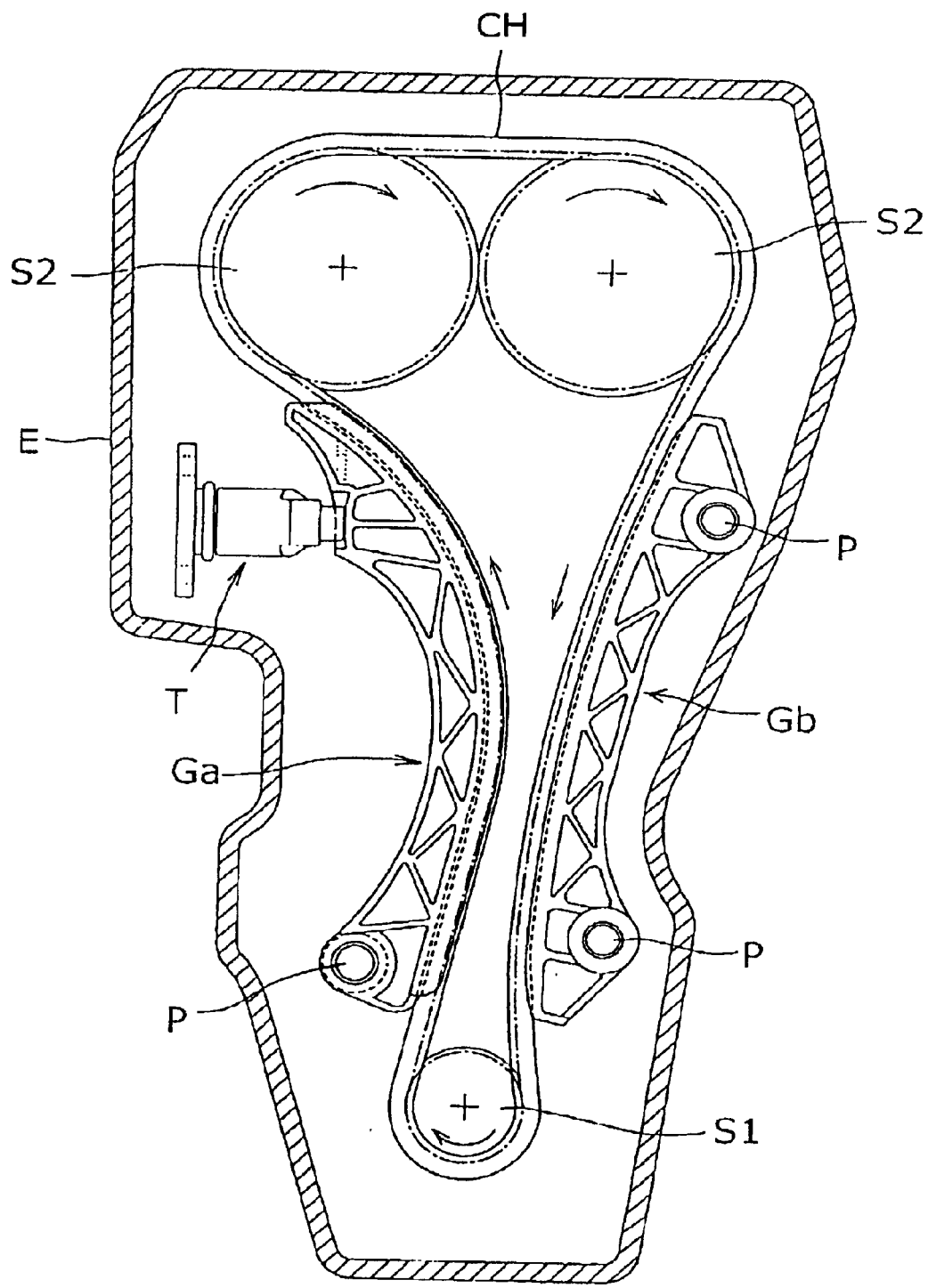
FIG. 12 is an elevational view showing movable and fixed guides used in an engine for guiding, and maintaining tension in, an endless, circulating, flexible transmission medium.

Because the bearing portion of the reinforcing plate is in the form of a circular arc and has an open portion, when such reinforcing plates are punched out of a rolled sheet material M, waste of sheet material is substantially reduced and material cost is reduced accordingly. For example, the unnecessary portions NG, shown in FIG. 6, are significantly smaller in area than the corresponding unnecessary portions shown in FIG. 11.

Figure 7:
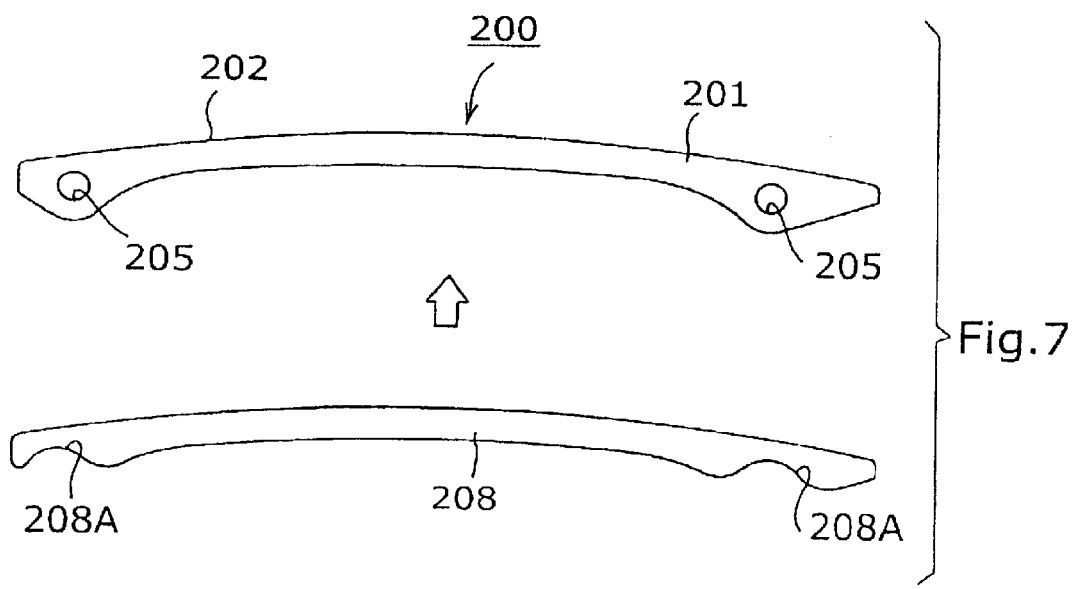
FIG. 7 exploded view of a fixed guide in accordance with a second embodiment of the invention.
Figure 8:
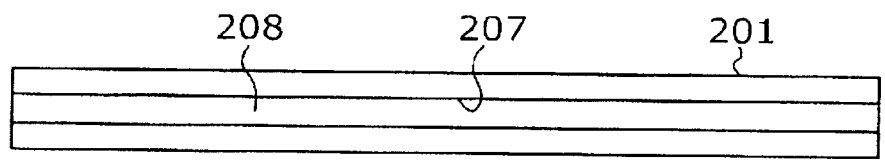
FIG. 8 is a bottom plan view of the fixed guide of FIG. 7.
Figure 9:
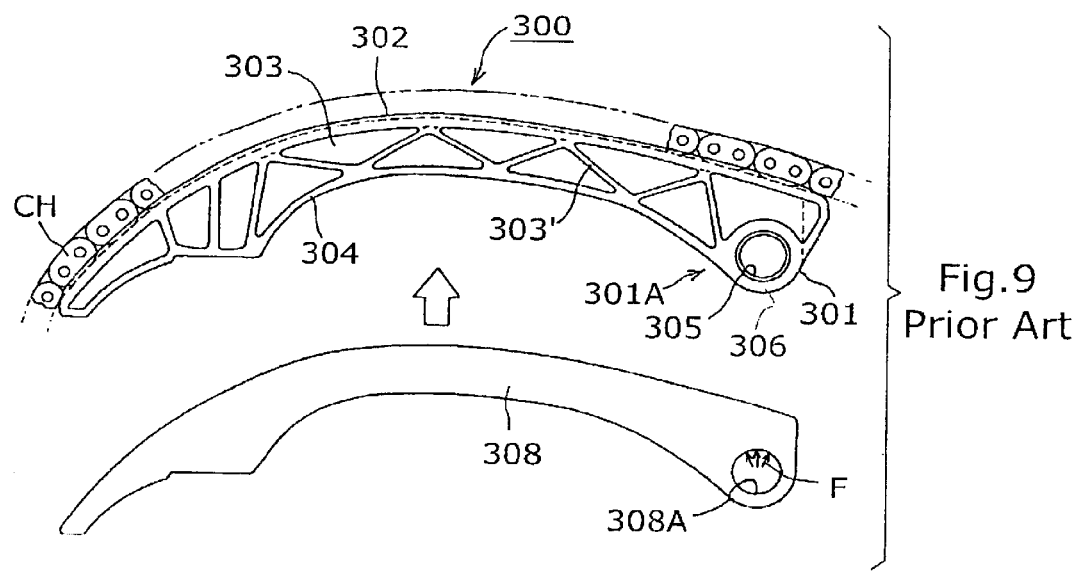
FIG. 9 is an exploded side elevational view of a conventional movable guide.
Figure 10:
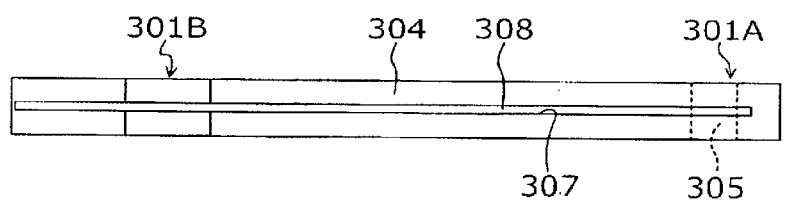
FIG. 10 is a bottom plan view of the conventional movable guide of FIG. 9.

As illustrated in FIGS. 7 and 8, guide 200 is a fixed guide is formed by incorporating a reinforcing plate 208 into a guide plate 201. Arcuate bearing portions 208A, formed near both ends of the reinforcing plate 208 have radii larger than the radius of the mounting holes 205 formed near both ends of the guide body 201. As a result, positioning of the guide body 201 and the reinforcing plate 208 is easy and the efficiency with which the guide can be assembled is significantly improved.

In the case of the pivoting guide, as described above with reference to FIGS. 1–5, even if the guide body and the reinforcing plate are not precisely positioned relative to each other during assembly, a mounting shaft such as a mounting bolt, pin, or the like can be easily inserted into the mounting hole. Moreover, even if the reinforcing plate is slightly shifted relative to the guide body, when the assembly is mounted on the mounting shaft, the reinforcing plate is moved so that the shaft is received in the deepest portion of the bearing portion of the reinforcing plate due to the arcuate shape of the bearing portion, so that appropriate positioning of the guide body and the reinforcing plate relative to each other is achieved. Accordingly, the assembly efficiency of the sliding contact guide is significantly improved.

Furthermore, since the sliding contact guide in accordance with the invention has a partly open, arcuate bearing portion instead of an insertion hole for positioning the guide body and the reinforcing plate relative to each other and fastening them together, the amount of material used to produce the reinforcing plate can be reduced, and a weight reduction is achieved. Moreover, when the reinforcing plates are punched out of a sheet, the yield is improved, and waste of material is decreased. Consequently the material cost is reduced significantly.

Finally, no changes in the production steps are required, and the strength of the sliding contact guide of the invention is not impaired at all compared to conventional sliding contact guides, and the guide has great utility and value in industry.

We claim:

1. A sliding contact guide for a traveling, flexible power transmission medium comprising an elongated guide body and a reinforcing plate for reinforcing the guide body;

the guide body including a shoe having opposite front and back sides, a transmission engaging surface on said front side, and facing in a first direction, for sliding contact with a traveling flexible power transmission medium, and a plate-receiving portion extending longitudinally along said back side, the shoe and plate-receiving portion of the guide body being integrally molded as a unit from a synthetic resin, and the plate-receiving portion having a longitudinally extending slot having an opening facing in a direction opposite to said first direction; and said reinforcing plate being fitted in said slot in said plate-receiving portion, and extending along the longitudinal direction of the guide;

the guide body having a mounting hole adjacent one end thereof for receiving a mounting shaft, the mounting hole having an inner periphery, the inner periphery of the mounting hole being in the form of a closed cylindrical surface, for completely surrounding said mounting shaft; and an arcuate bearing portion formed on the reinforcing plate adjacent one end thereof, the arcuate bearing portion being in register with a part of said inner periphery of the mounting hole for engagement with said mounting shaft, the arcuate bearing surface having ends spaced from each other to provide an opening, whereby, when the guide is mounted on a mounting shaft, the arcuate bearing portion extends around only a part of the circumference of the mounting shaft.

2. A sliding contact guide according to claim 1, in which the radius of the arc of said bearing portion is larger than the radius of said mounting hole of the guide body.

* * * * *

UNITED STATES PATENT AND TRADEMARK OFFICE
CERTIFICATE OF CORRECTION

PATENT NO. : 6,849,013 B2  
DATED : February 1, 2005  
INVENTOR(S) : Masahiko Konno et al.

Page 1 of 1

It is certified that error appears in the above-identified patent and that said Letters Patent is hereby corrected as shown below:

Title page,
Item [*] Notice, change "0" days to -- 102 -- days.

Signed and Sealed this

Tenth Day of May, 2005

JON W. DUDAS
*Director of the United States Patent and Trademark Office*